United States Patent [19]

Bala

[11] Patent Number: 5,069,337
[45] Date of Patent: Dec. 3, 1991

[54] BITE-RESISTANT SHEATH FOR PROBE

[76] Inventor: Harry Bala, 7 Corey Dr., S. Barrington, Ill. 60010

[21] Appl. No.: 731,306

[22] Filed: Jul. 16, 1991

Related U.S. Application Data

[63] Continuation of Ser. No. 388,701, Aug. 2, 1989, abandoned.

[51] Int. Cl.⁵ ............................................. B65D 85/38
[52] U.S. Cl. .................................... 206/306; 206/212; 206/363
[58] Field of Search ............... 206/306, 212, 363, 484, 206/804; 229/87.01

[56] References Cited

U.S. PATENT DOCUMENTS

| | | | |
|---|---|---|---|
| 3,308,940 | 3/1967 | Morris Jr. | 206/306 |
| 3,732,975 | 5/1973 | Poncy | 206/306 |
| 3,752,309 | 8/1973 | Hopkins et al. | 206/306 |
| 3,838,600 | 10/1974 | Ersek et al. | 206/306 |
| 3,908,052 | 9/1975 | Sanders | 206/459 |
| 4,051,950 | 10/1977 | Jarund | 206/309 |
| 4,654,240 | 3/1987 | Johnston | 206/524.6 |
| 4,662,145 | 3/1987 | Bjornberg | 206/306 |
| 4,823,949 | 4/1989 | Bala | 206/306 |

Primary Examiner—David T. Fidei
Attorney, Agent, or Firm—George H. Gerstman; Garrettson Ellis

[57] ABSTRACT

A sheath for a probe comprises a flat probe sheath having an open end and a closed end with the sheath defining a pair of peripherally connected flat sides. By this invention, each flat side of the sheath defines a portion, positioned at least intermediate the sheath ends, which portion comprises a pair of joined inner and outer plastic layers. The inner plastic layer is made of a material readily heat sealable with itself and the material of the outer plastic layer. The outer plastic layer is made of a material of a strength and thickness capable of substantially preventing bite-through in human mouths.

33 Claims, 2 Drawing Sheets

BITE-RESISTANT SHEATH FOR PROBE

This is a continuation of U.S. application Ser. No. 388,701, filed Aug. 2, 1989, now abandoned.

BACKGROUND OF THE INVENTION

Sheaths for thermometers or other probes are well known and in commercial use, being used to protect against any cross-infection from one patient to another by the reuse of incompletely sterilized glass thermometers or the like. Examples of such sheaths are as illustrated in the pending patent applications of Harry Bala, specifically U.S. application Ser. No. 205,316, filed June 10, 1988 and entitled Sheath for Probe, and U.S. application Ser. No. 212,969, filed June 29, 1988 and entitled Sheath for Thermometer and the Like.

The probe sheaths of the prior art are typically made in flattened form out of a pair of flat sides which are peripherally sealed together with the probe sheath being enclosed in a package. This of course requires the use of plastic sheeting which heat seals together in a reliable manner, such as polyethylene or poly(ethylmethyl acrylate), also known as EMA. Additionally, poly(ethylenevinyl acetate) (EVA) or equivalent material may be used.

The probe sheaths of the prior art perform adequately to provide a sealed sheath around oral or anal thermometers in normal circumstances. However, in the rare but unfortunate circumstance where an accident or an unruly patient breaks the thermometer during use, the probe sheaths of the prior art are sometimes of insufficient strength to avoid rupturing. This can, of course, cause shards of thermometer and mercury to pass into the patient. Additionally, the major purpose of the probe sheath may then fail, that is, the protection of the patient from bacterial or viral exposure from an incompletely sterilized thermometer or other probe. Particularly in the case of small children or certain disabled patients, the patients may bite through the probe sheaths of the prior art while the thermometer or other probes are inserted in the mouth, resulting in possible viral or bacterial exposure to the patient.

In accordance with this invention, an improved probe sheath is provided in which a reliable heat seal is provided to the probe sheath, but the sheath is of a strength which is capable of substantially preventing bite-through in the mouth when enclosing a glass thermometer or other probe.

While certain plastic materials are known to be much stronger than polyethylene, EMA, or EVA, such materials are generally less effective in heat sealing. For example, biaxially oriented poly(ethylene terephthalate) or polypropylene are very strong materials, but they are heat sealed only with difficulty to each other, so that a flattened probe sheath of the type typically used made of such materials would be unreliable due to the possibility of failure of the peripheral heat seal during use.

In accordance with this invention, an improved probe sheath is provided which combines both the necessary good heat sealing of peripherally connected flat sides of the probe sheath with a desired strength that is sufficient to substantially prevent bite-through in the human mouth. With such an increase in strength, the probe sheath is also much more reliable for protection against breakage of a glass thermometer being used, and also increased protection against bacterial or viral exposure is provided.

DESCRIPTION OF THE INVENTION

In this invention a sheath for a probe is provided which comprises a flattened probe sheath having an open end and a closed end. The sheath defines a pair of peripherally connected, flat sides.

In accordance with this invention, each flat side of the sheath defines at least a portion, positioned at least intermediate the sheath ends, which portion comprises a pair of joined inner and outer plastic layers. The inner plastic layer is made of a material which is readily heat sealable with itself, and the material of the outer plastic layer. The outer plastic layer is made of a material which is of a strength and thickness capable of substantially preventing bite-through in human mouths when enclosing a glass thermometer or other probe.

Typically, the outer plastic layer may be made of biaxially oriented poly(ethylene terephthalate), polypropylene, or other equivalent material. The inner plastic layer is made of a material such as polyethylene, EMA, or EVA, the material of the inner plastic layer being sealingly compatible with the specific material of the outer plastic layer used so that a good heat seal may be made between the respective inner plastic layers of the flat sides of the sheath, with the outer plastic layers being bonded by typically the same heat seal through the material of the respective inner plastic layers. Thus, a sheath for a probe is provided which exhibits a strong, peripheral heat seal for good sealing of the respective flat sides, coupled with high strength which is chiefly provided by the outer plastic layer.

Typically, the thickness of the outer plastic layer is from 0.0005 to 0.002 inch, which is the range where good bite-resistance is provided, coupled with a sufficiently low thickness so that adequate heat transfer may take place, so that the sheath may be used for a thermometer, for example. The thickness of the inner plastic layer is typically 0.001 to 0.002 inch.

Preferably, a portion of the inner layers of the probe sheath adjacent the closed end thereof extend beyond the outer plastic layers. This innermost section of the probe sheath is proportioned to be well spaced from the teeth, and to lie under the tongue with the thermometer when placed in the mouth. The portion of the probe sheath which may be engaged by the teeth is the portion which preferably carries the outer layers as well. Thus, heat transfer to a thermometer within the probe sheath may be maximized in the probe sheath area adjacent the closed end, while strength is maximized in at least central sections thereof which will be adjacent the teeth during use.

In some embodiments, the outer plastic layers may extend at least to the open end of the sheath, where they may terminate in tabs which may be manually spread apart to facilitate access of the thermometer or other probe into the sheath.

Typically, the inner and outer plastic layers of the probe sheath may be joined together by a peripheral heat seal line that connects the flat sides of the probe sheath. This heat seal line thus converts four layers of flat plastic sheeting into the probe sheath in a simple sealing operation.

Also, when a portion of the probe sheath adjacent the closed end extends beyond the outer plastic layers, there may be a transverse seal across a portion of the outer plastic layers closest to the closed sheath end to transversely seal all spaces between the outer plastic layers of the flat sides of the probe sheath, except for an opening within the inner plastic layers of the sheath. Such a transverse seal may provide sealing protection against exposure to stray contamination, should the patient bite down hard enough on the probe sheath to rupture the inner plastic layers, even though the outer plastic layers are not ruptured. The transverse seal described above, in that circumstance, presents the migration of contamination between the inner and outer plastic layers into contact with the patient.

Means may be provided in certain embodiments of the probe sheath to facilitate the removal of portions of the inner and outer plastic layers which are positioned outwardly of the peripheral heat seal line described above. This may improve the comfort of the probe sheath in use.

If desired, the inner and outer plastic layers of each flat side may be laminated to each other, to form in effect a single, laminated layer. Such a laminated material may facilitate manufacture of the probe sheath.

Also, the outer plastic layers of each side, if desired, may be spaced from each end of the sheath, to be rather like a belt around the middle, being positioned in the area where the teeth are most likely to engage the probe sheath.

Thus, a probe sheath is provided which is easily made by techniques similar to current manufacturing processes, but which exhibits a significant increase in strength, to provide bite-resistance and added security to patients.

DESCRIPTION OF SPECIFIC EMBODIMENTS

Figure 1:
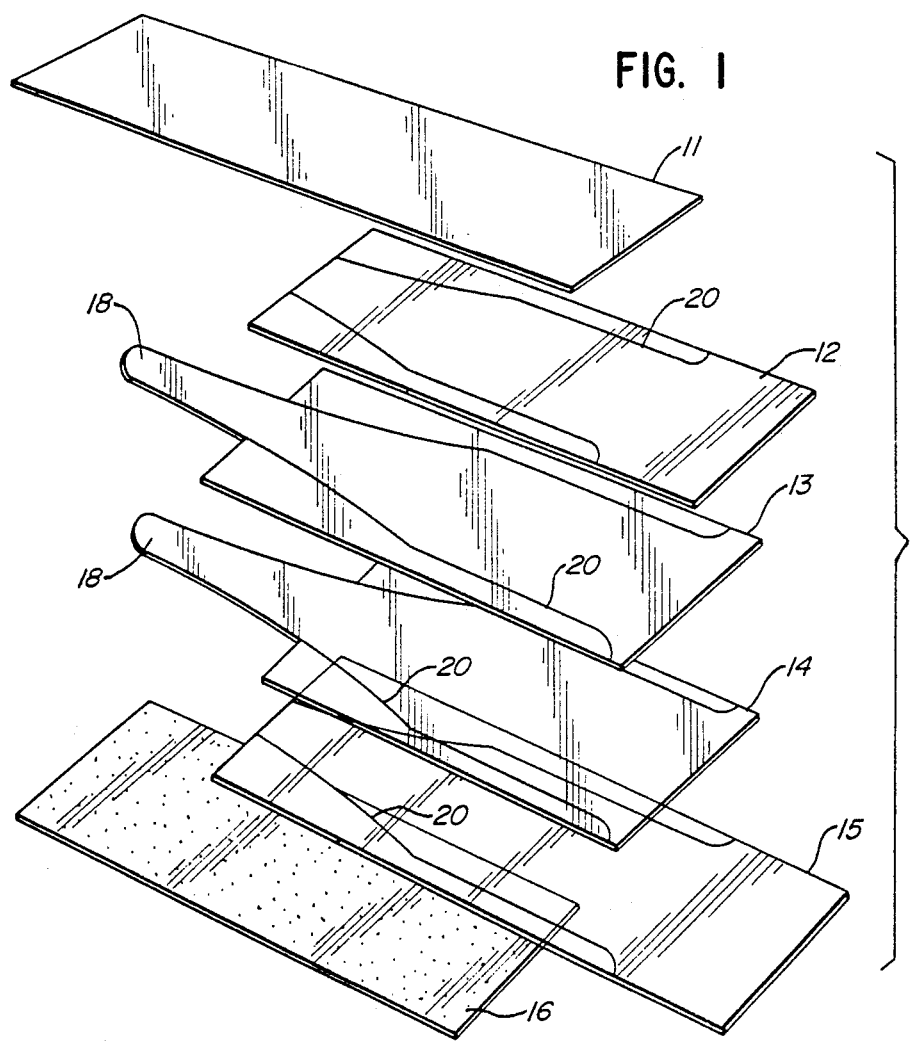
FIG. 1 is an exploded perspective view of the probe sheath in accordance with this invention.
Figure 2:
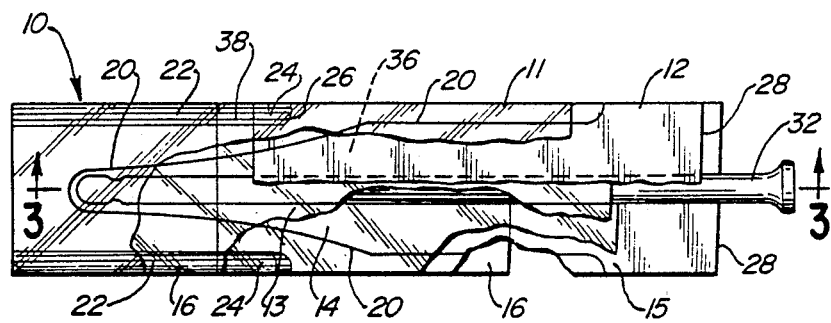
FIG. 2 is a plan view, with portions broken away, of the probe sheath of FIG. 1, showing a thermometer inserted therein.
Figure 3:
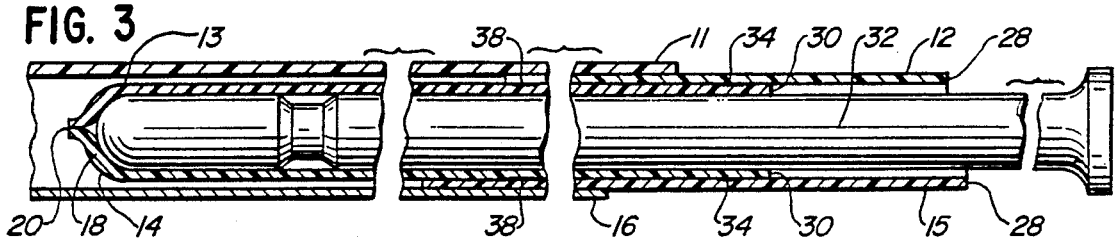
FIG. 3 is a sectional view taken along line 3—3 of FIG. 2.

Referring to FIGS. 1 thru 3, packaged probe sheath 10 is disclosed, comprising six plastic or paper layers, 11–16 of a form as shown in exploded FIG. 1, and sealed together into a multilayer probe sheath and package as shown in FIGS. 2 and 3.

Outer layers 11 and 16 provide the outer package for protection of particularly the inner, closed-end portion 18 of inner plastic layers 13, 14 which define the connected, flat sides of the probe sheath. Outer plastic layers 12, 15 are also provided, being made of Mylar brand poly(ethylene terephthalate), for example, while the material of inner plastic layers 13, 14 is typically made of EMA such as Chevron copolymer resin 2255 or polyethylene.

A peripheral heat seal line 20 is provided between the joined plastic layers 12–15, but in the specific embodiment shown, such heat seal line 20 does not include layers 11 or 16. Instead, layers 11 and 16 are joined together at lateral seal sections 22, being a heat seal between polyethylene plastic layer 11 and paper layer 16. Seal lines 22 may incorporate a small amount of the forward portion 24 of layer 12, so that in section 24 a heat seal spot is provided between sheath layer 12 and outer plastic layer 11, to provide firm retention of the inner sheath with the sealed outer layers 11, 16.

It can be seen that seal lines 22 terminate at inner ends 26. Lines 22 may extend only a minor portion of the entire length of the sheath package, since the outer package layers 11, 16 are primarily to protect the forward ends 18 of the flat sides of the probe sheath.

As can be seen in FIGS. 2 and 3, the ends 28 of layers 12 and 15 project rearwardly beyond the ends 30 of inner plastic layers 13, 14 so that ends 28 serve as a pair of integral tabs which can be manipulated to spread open the probe sheath end for insertion of the thermometer 32 or the like. Outer plastic sheets 12, 15 are heat sealed by transverse seals 34 respectively to their adjoining inner plastic layers 13, 14 as shown in FIG. 3.

Accordingly, one may grasp the ends 28 of the formed probe sheath 10, and one may peel away the outer protective sheets 11, 16. Then, either before or after that step, thermometer 32 may be inserted, and then used.

It can be seen that the size of the inner aperture 36 of the sheath, as defined by seal line 20, is of a size to accommodate an electronic temperature probe, if desired. Alternatively, the shape of seal line 20 may be modified to more closely enclose a thermometer 32 if that is the prime, intended use of the probe.

Because of the existence of the layers 12 and 15, it is substantially impossible to bite through those outer plastic layers. The presence of transverse seal heat seal 38 at the forward ends of layers 12 and 15 provide additional protection in that seal 38 provides a seal of the spaces between the respective inner layers 13, 14 and the outer layers 12, 15, except of course for the opening between inner layers 13, 14 through which thermometer 32 passes. Hence, even if inner layers 13, 14 are breached due to the pressure of a bite, no contamination migration path is provided between thermometer 32 and the area forward of the seal 38, and the stronger outer layers 12, 15 are provided to keep the seal intact.

Nevertheless, peripheral heat seal line 20, and transverse seal lines 34, 38 are strong and reliable because inner layers 13, 14 are made of a good, heat sealable material which is sealably compatible with the stronger material of layers 12 and 15, so that a probe sheath of increased reliability is provided.

Figure 4:
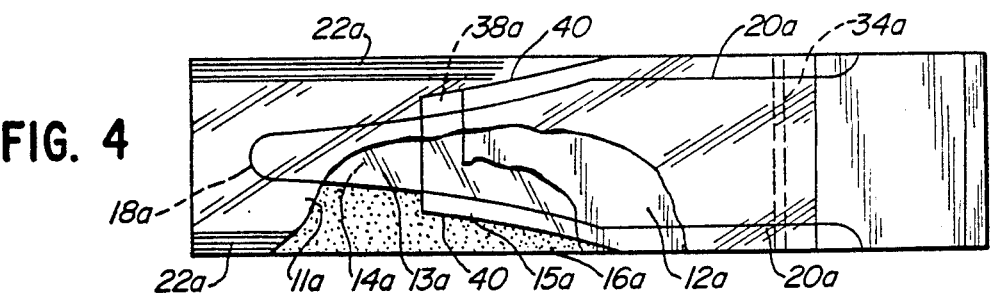
FIG. 4 is a plan view, with portions broken away, of a modified embodiment of the probe sheath of FIG. 1.

Referring to FIG. 4, an embodiment of packaged sheath is disclosed, being similar to the embodiment of FIGS. 1 thru 3 with some small differences as disclosed herein. Plastic layers 11a–15a are disclosed, and bottom paper layer 16a as well, being analagous in both structure and function to the layers of similar number in the probe sheath package shown in FIGS. 1–3.

However, by way of modification, outer plastic layers 12a, 15a have been trimmed to form tapering sides 40 at their distal end, which is adjacent the projecting portion of inner plastic layers 13a, 14a which define the closed end 18a of the sheath end 18a being spaced from the outer plastic layers 12a, 15a.

Otherwise, the structure of the probe sheath package may be the same as the structure of the FIGS. 1–3, where peripheral seal line 20a seals together plastic sheets 12a, 15a, and the remaining seal lines 22a, 34a and 38a function in a manner similar to the seals of the previous embodiment.

Figure 5:
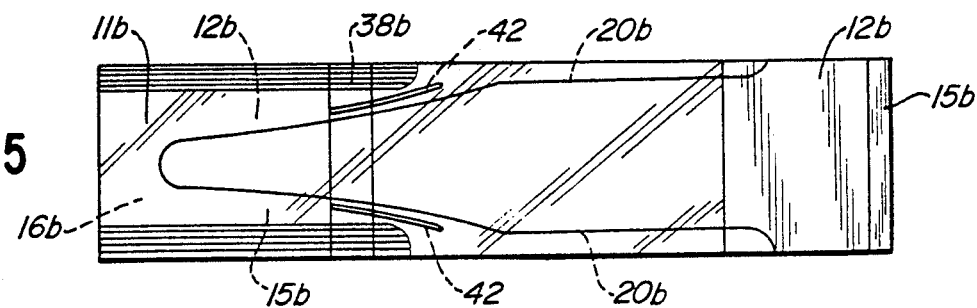
FIG. 5 is a second modified embodiment of the probe sheath of this invention.

Referring to FIG. 5, yet another embodiment of probe sheath is provided, being of similar design to the embodiment of FIGS. 1-3 except as otherwise indicated. For simplicity of disclosure, the probe sheath of FIG. 5 is not broken away as the illustration of the previous embodiment, but the same respective layers are provided, being exemplified by the illustration of the top and bottom layers 11b and 16b. The probe sheath is defined in a manner similar to that of the previous embodiments, making use of peripheral seal line 20b to secure together the peripherally connected, flat sides, each comprising a pair of joined inner and outer plastic layers of the type described above. The other seal lines such as seal line 38b are also provided as in the previous embodiments.

In this specific embodiment, a slit 42 is defined in the sheets which define the joined outer plastic layers 12b and 15b. Thus, upon opening of the probe sheath by peeling away of the outer layers 11b, 16b, portions of plastic layers 12b, 15b outside of slit 42 can also be removed, for greater comfort in the mouth of the patient.

Figure 6:
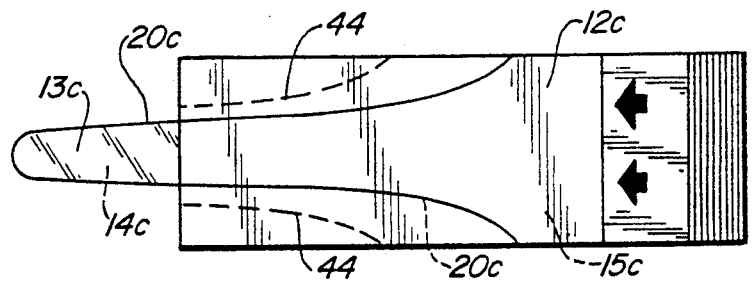
FIG. 6 is a third modified embodiment of the probe sheath of this invention, showing the probe sheath without its outer package.

Referring to FIG. 6, a modified embodiment of probe sheath is shown, similar to the probe sheath of FIGS. 1-3 but with the outer package layers, analagous to layers 11-16, having been removed. The inner plastic layers 13c, 14c are disclosed, being sealed together along peripheral seal line 20c, with a proximal portion of the probe sheath carrying outer plastic layers 12c, 15c, all in a manner analagous to the previous embodiments. Specifically, it can be seen that peripheral seal line 20c is of a narrower shape, to be especially configured to receive a conventional glass thermometer rather than being of a wider configuration to receive an electronic thermometer. However a glass thermometer may be used with the wider configuration as well, as particularly shown in FIG. 2. Also, tear lines or perforations 44 are provided, to permit tearing away of excess lateral portions of outer plastic layers 12c, 15c for greater comfort in the mouth of the patient.

Figure 7:
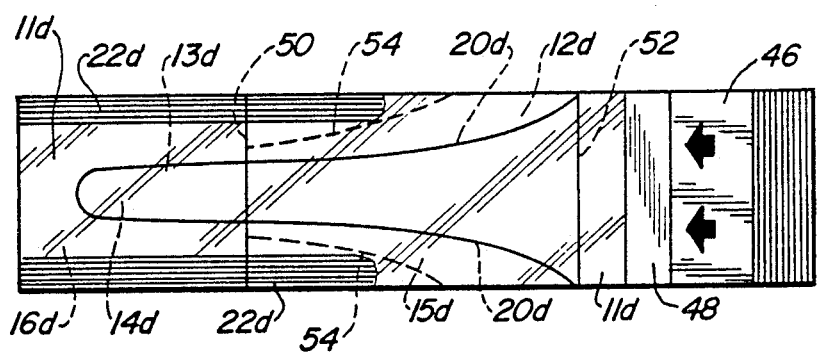
FIGS. 7 and 8 are further modified embodiments of the probe sheath of this invention.

Referring to FIG. 7, another embodiment of the sheath for probe of this invention is disclosed, broadly similar to the embodiment of FIGS. 1-3, except as otherwise disclosed herein.

As before, top and bottom package layers 11d, 16d are provided, being of similar structure and function to the corresponding layers of the previous embodiments. The closed-end sheath made from the joined inner plastic layers 13d, 14d is also disclosed. Layer 14d carries a plastic end tab 46, while layer 13d carries another, shorter plastic end tab 48, so that the two end tabs may be manually spread and a thermometer inserted into the probe sheath between inner plastic layers 13d, 14d. As before, the probe sheath is defined by a peripheral heat seal 20d.

Outer plastic layers 12d, 15d are provided between layers 11d, 16d in their position analagous to that of the prior embodiments, but in this embodiment outer plastic layers 12d, 15d extend only from intermediate end 50, short of the distal end of the sheath, to the proximal end 52 of peripheral seal line 20d, which seal line is similar to those of previous embodiments. Thus, outer plastic layers 12d, 15d form a belt around the middle of the probe sheath, terminating short of either end thereof, and positioned at the location where the teeth may engage the probe sheath while a thermometer is inserted in the mouth. The extra strength of layers 12d, 15d provides protection to the probe sheath in a manner similar to previous embodiments, while using less material.

Also, tear lines or slots 54 may be defined in sheets 12d, 15d for removal of peripheral portions thereof outside tear lines or slots 54 in a manner similar to the FIG. 5 embodiment. Also, heat seals 22d, similar in construction to the heat seals of the same number in prior embodiments, may be connected in part to the removable, peripheral portions of outer plastic layers 12d, 15d, so that removal of the outer layers 11d, 16d, causes automatic removal of the peripheral portions, resulting in an exposed probe sheath that has a tapered aspect and is more conveniently used.

Figure 8:
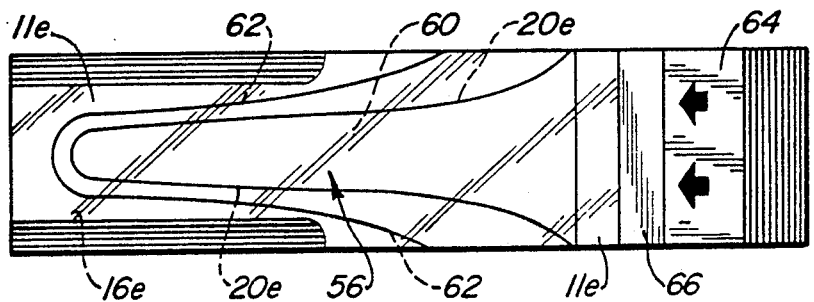

Referring to FIG. 8, this also is generally similar to the embodiment of FIGS. 1-3, having outer layers 11e, 16e, like the similarly numbered layers of previous embodiments. However, in this circumstance, probe sheath 56 comprises a pair of peripherally connected, flat sides, each of which are made of a layer 60 of laminated plastic material having an inner layer which is readily heat sealable such as polyethylene, and an outer plastic layer of sufficient strength to substantially prevent bite-through in human mouths, such as polypropylene. The two layers (corresponding to the four prior layers 12-15) are bonded together by a peripheral seal line 20e, as before, and a peripheral tear line 62 is also provided.

The bottom, laminated layer 60 is connected to an end tab 64, while the top, laminated plastic layer 60 is connected to an end tab 66, and accordingly, one can spread end tab 64 and 66 to insert the thermometer into probe sheath. Following thermometer insertion, one may tear apart the outer layers 11e, 16e, also severing tear line 62 in layers 60 to expose a desired probe sheath 56 for use. This probe sheath is made primarily of the laminated plastic material described above which functions in a manner equivalent to the probe sheath previously described, and exhibits similar advantages, while having the added advantage of simplified manufacture due to the elimination of two separate layers from the start.

Alternatively, this structure can be made from four corresponding, nonlaminated layers which are held together by heat seal lines, as in previous embodiments.

For any of the above designs, unnecessary lateral portions of the respective layers, outside of the thermometer sheath itself, may be pre-cut away before packaging, to spare the user that task.

As a further embodiment, probes and packages for the probes may be made in accordance with this invention, in which all layers of the double thickness sheath walls and the outer package layer may be sealed together along a common heat seal line in a manner similar to that disclosed in Poncy U.S. Pat. No. 3,732,975 but making use of the inventive features described in this present application. In such a circumstance, the outer package layers may be torn off prior to use.

The the above has been offered for illustrative purposes only, and is not intended to limit the scope of the invention of this application, which is as defined in the claims below.

That which is claimed is:

1. In a sheath for a probe which comprises a flattened probe sheath having an open end and a closed end, said sheath defining a pair of peripherally connected, flat sides, the improvement comprising, in combination:

each flat side of said sheath defining at least a portion, positioned at least intermediate the sheath ends, which portion comprises a pair of permanently joined inner and outer plastic layers, said inner plastic layer being made of a material readily heat sealable with itself and the material of the outer plastic layer; the outer plastic layer being of greater penetration strength than said inner plastic layer and sealingly compatible therewith, whereby said sheath is capable of substantially preventing bite-through in human mouths when enclosing a probe, said inner and outer plastic layers being joined by a heat seal line that also peripherally connects the flat sides of said probe sheath.

2. The probe sheath of claim 1 in which said outer plastic layer is made of a material selected from the group consisting of biaxially oriented poly(ethylene terephthalate) and polypropylene.

3. The probe sheath of claim 1 in which said inner plastic layer is made of a material selected from the group consisting of polyethylene and EMA.

4. The probe sheath of claim 1 in which a portion of the inner plastic layers of said probe sheath adjacent said closed end extends beyond said outer plastic layers.

5. The probe sheath of claim 1 in which said outer plastic layers extend at least to the open end of said sheath.

6. The probe sheath of claim 1 in which a portion of said probe sheath adjacent said closed end extends beyond said outer plastic layers, said probe sheath defining a transverse seal across a portion of the outer plastic layers closest to said closed end, to transversely seal all spaces between the outer plastic layers of the flat sides except for an opening within the inner plastic layers of said sheath.

7. The probe sheath of claim 1 in which means are provided to facilitate removal of portions of said inner and outer plastic layers positioned outwardly of said heat seal line.

8. The probe sheath of claim 1 in which the inner and outer plastic layers of each flat side are laminated to each other.

9. The probe sheath of claim 1 in which said outer plastic layers of each side are spaced from each end of said sheath.

10. In a sheath for a probe which comprises a flat probe sheath having an open end and a closed end, said sheath defining a pair of peripherally connected, flat sides, the improvement comprising, in combination:

each flat side of said sheath defining at least a portion, positioned at least intermediate the sheath ends, which portion comprises a pair of joined inner and outer plastic layers, said inner plastic layer being made of material readily heat sealable with itself and the material of the outer plastic layer; the outer plastic layer being of greater penetration strength than said inner layer and sealingly compatible therewith, whereby said sheath is capable of substantially preventing bite-through in human mouths when enclosing a probe; in which a portion of the inner plastic layers of said probe sheath adjacent said closed end extends beyond said outer plastic layers, and in which said inner and outer plastic layers are joined together by a heat seal line that also peripherally connects the flat sides of said probe sheath.

11. The probe sheath of claim 10 in which said outer plastic layer is made of a material selected from the group consisting of biaxially oriented poly(ethylene terephthalate) and polypropylene, and the inner plastic layer is made of a material selected from the group consisting of polyethylene and EMA, sealingly compatible with the outer plastic layer material.

12. The probe sheath of claim 11 in which the thickness of said outer plastic layer is from 0.0005 to 0.002 inch.

13. The probe sheath of claim 12 in which said outer plastic layers extend at least to the open end of said sheath.

14. The probe sheath of claim 13, said probe sheath defining a transverse seal across a portion of the outer plastic layers closest to said closed end, to transversely seal all spaces between the outer plastic layers of the flat sides except for the opening within the plastic layers of said sheath.

15. The probe sheath of claim 14 in which means are provided to facilitate removal of portions of said inner and outer plastic layers positioned outwardly of said heat seal line.

16. In a sheath for a probe which comprises a flattened probe sheath having an open end and a closed end, said sheath defining a pair of peripherally connected, flat sides, the improvement comprising, in combination:

each flat side of said sheath defining at least a portion, positioned at least intermediate the sheath ends, which portion comprises permanently laminated plastic sheeting comprising inner and outer plastic layers, said inner plastic layer being made of a material readily heat sealable with itself and the material of the outer plastic layer, the outer plastic layer being of greater penetration strength than said inner layer and sealingly compatible therewith, whereby said sheath is capable of substantially preventing bite-through in human mouths when enclosing a probe, said flat sides being connected together by a heat seal line to define said sheath, said laminated inner and outer plastic layers extending substantially the entire length of said sheath.

17. The probe sheath of claim 16 in which said outer plastic layers are made of material selected from the group consisting of biaxially oriented poly(ethylene terephthalate) and polypropylene, and the inner plastic layers are made of a material selected from the group consisting of polyethylene and EMA.

18. In a sheath for a probe which comprises a flattened probe sheath having an open end and a closed end, said sheath defining a pair of peripherally connected, flat sides, the improvement comprising, in combination:

each flat side of said sheath defining at least a portion, positioned at least intermediate the sheath ends, which portion comprises a pair of permanently joined inner and outer plastic layers, said inner plastic layer being made of a material selected from the group consisting of polyethylene and EMA, the outer plastic layer being made of a material selected from the group consisting of biaxially oriented poly(ethylene terephthalate) and polypropylene, the thickness of said outer plastic layer being from 0.0005 to 0.002 inch, said sheath being capable of substantially preventing bite-through in human mouths when enclosing a probe, said inner and outer plastic layers being joined together by a heat seal line that also peripherally connects the flat sides of said probe sheath.

19. The probe sheath of claim 18 in which a portion of the inner plastic layers of the flat sides of said probe sheath adjacent said closed end extend beyond said outer plastic layers.

20. In a sheath for a mouth probe which comprises a flattened probe sheath having an open end and a closed end, said sheath defining a pair of peripherally connected, flat sides, the improvement comprising, in combination:

each flat side of said sheath defining at least a portion, positioned at least intermediate the sheath ends in a position to engage the teeth of a user, which portion comprises a pair of permanently joined inner and outer plastic layers, a first of said plastic layers being of greater penetration strength than the other of said plastic layers to provide said sheath with the capability of substantially preventing bite-through in human mouths when enclosing a probe, said plastic layers being joined together by a heat seal line that also peripherally connects the flat sides of said probe sheath.

21. The probe sheath of claim 20 in which the other of said plastic layers is made of a material which is softer than the material of the first of said plastic layers, portions of the other of said plastic layers of the flat sides of said probe sheath extending adjacent said closed end beyond said first of said plastic layers.

22. The probe sheath of claim 20 in which said first of said plastic layers extends at least to the open end of said sheath.

23. The probe sheath of claim 20 in which portions of said other plastic layers of the flat sides adjacent said closed end extend beyond said first plastic layers, said probe sheath defining a transverse seal across a portion of the first and other plastic layers adjacent to said closed end, to transversely seal all spaces between the plastic layers except for an opening within the innermost plastic layers of said sheath to receive a probe.

24. The probe sheath of claim 20 in which the first plastic layers are positioned outside of the other plastic layers.

25. The probe sheath of claim 20 in which the first and other plastic layers of each flat side are laminated to each other.

26. The probe sheath of claim 20 in which a pair of peripherally sealed outer packaging layers enclose the probe sheath.

27. In a sheath for a probe which comprises a flattened probe sheath having an open end and a closed end, said sheath defining a pair of peripherally connected, flat sides, the improvement comprising, in combination:

each flat side of said sheath defining at least a portion, positioned at least intermediate the sheath ends, which portion comprises a pair of permanently joined inner and outer plastic layers, a first of said plastic layers being of greater penetration strength than the other of said plastic layers to provide said sheath with the capability of substantially preventing bite-through in human mouths while enclosing a probe, and further in which portions of the other of said plastic layers of the flat sides of said probe sheath extend adjacent said closed end beyond said first of said plastic layers, the overall length of the first of said plastic layers being greater than the overall length of the portions of the other of said plastic layers which extend beyond the first of said plastic layers.

28. The probe sheath of claim 27 in which said probe sheath defines a transverse seal across a portion of said first and other plastic layers adjacent said closed end, to transversely seal all spaces between the plastic layers except for an opening within the innermost plastic layers of said sheath to receive a probe.

29. The probe sheath of claim 27 in which said plastic layers are joined together by a heat seal line that also peripherally connects the flat sides of said probe sheath, and said other plastic layer is softer than the first plastic layer.

30. The probe sheath of claim 29 in which a pair of peripherally sealed outer packaging layers enclose the probe sheath.

31. The probe sheath of claim 30 in which the first plastic layers are positioned outside of the other plastic layers.

32. The probe sheath of claim 21 in which the overall length of the first of said plastic layers is greater than the overall length of the portions of the other of said plastic layers which extend beyond the first of said plastic layers.

33. The probe sheath of claim 4 in which the overall length of said outer plastic layers is greater than the length of those portions of the inner plastic layers that extend beyond the outer plastic layers.

* * * * *